United States Patent
Boeke et al.

(10) Patent No.: US 9,752,446 B2
(45) Date of Patent: Sep. 5, 2017

(54) SUPPORT BUTTRESS

(71) Applicant: United Technologies Corporation, Hartford, CT (US)

(72) Inventors: Mark A. Boeke, Plainville, CT (US); Richard M. Salzillo, Jr., Plantsville, CT (US); Jeffrey J. Degray, Somers, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 422 days.

(21) Appl. No.: 14/593,886

(22) Filed: Jan. 9, 2015

(65) Prior Publication Data
US 2016/0201485 A1    Jul. 14, 2016

(51) Int. Cl.
F01D 9/06    (2006.01)
F01D 9/02    (2006.01)
F01D 25/28    (2006.01)
F01D 9/04    (2006.01)

(52) U.S. Cl.
CPC .............. F01D 9/023 (2013.01); F01D 9/04 (2013.01); F01D 9/06 (2013.01); F01D 25/28 (2013.01); F05D 2240/81 (2013.01)

(58) Field of Classification Search
CPC ... F01D 5/081; F01D 5/18; F01D 9/06; F05D 2240/81
See application file for complete search history.

(56) References Cited

U.S. PATENT DOCUMENTS 5,320,483 A * 6/1994 Cunha ................... F01D 5/187
                                                            415/114
7,534,088 B1    5/2009 Alvanos et al.
9,334,754 B2 * 5/2016 Khanin ................... F01D 5/187
2007/0237637 A1 * 10/2007 Lee ......................... F01D 5/20
                                                            416/97 R
2013/0209231 A1 * 8/2013 Davis ..................... F01D 9/041
                                                            415/115

FOREIGN PATENT DOCUMENTS

WO    2012007250    1/2012
WO    2014105236    7/2014

OTHER PUBLICATIONS

Extended European Search Report dated May 25, 2016 in European Application No. 16150247.1.

* cited by examiner

*Primary Examiner* — Nathaniel Wiehe
*Assistant Examiner* — Brian O Peters
(74) *Attorney, Agent, or Firm* — Snell & Wilmer L.L.P.

(57) ABSTRACT

An airfoil of a turbine engine may have internal passages to permit the travel of cooling air through the airfoil. Multiple airfoils may be formed together in a stator vane assembly, and cooling air may be directed through the stator vane assembly. The stator vane assembly may be mounted to an engine structure to carry structural loads experienced by the stator vane assembly. Buttresses may be formed in the stator vane assembly, such as beneath each airfoil of the stator vane assembly, and extending into a passage permitting the travel of cooling air through the airfoil. The buttresses may enhance the strength and stability of the stator vane assembly by facilitating the transmission of structural loads to an engine structure. A channel may be defined through one or more buttress to enable the passage of cooling air into the airfoils, and yet allow the buttresses to carry structural loads.

18 Claims, 6 Drawing Sheets

SUPPORT BUTTRESS

FIELD

The present disclosure relates generally to a gas turbine engine, and more specifically, to airfoils such as rotor blades and/or stator vanes.

BACKGROUND

A gas turbine engine may include a turbine section with multiple rows or stages of stator vanes and rotor blades that interact or react with a high temperature gas flow to create mechanical power. In a gas turbine engine, the turbine rotor blades drive the compressor and, optionally, an electric generator to generate mechanical and/or electrical power.

The efficiency of the engine can be increased by passing a higher temperature gas flow through the turbine. However, the turbine inlet temperature is limited to the vane and blade (airfoils) material properties and the cooling capabilities of these airfoils. The first stage airfoils are exposed to the highest temperature gas flow since these airfoils are located immediately downstream from the combustor. The temperature of the gas flow passing through the turbine progressively decreases as the rotor blade stages extract energy from the gas flow. The leading edge of the vane and blade airfoils is exposed to high temperature gas flow.

SUMMARY

The forgoing features and elements may be combined in various combinations without exclusivity, unless expressly indicated herein otherwise. These features and elements as well as the operation of the disclosed embodiments will become more apparent in light of the following description and accompanying drawings.

A vane assembly is disclosed. The vane assembly may include a first stator vane defining an inner fluid channel disposed radially inward of the first stator vane, and a first stator vane buttress including a boss disposed radially inward of the first stator vane and extending radially into the inner fluid channel. The first stator vane buttress may define a first stator vane cooling channel extending radially through the first stator vane buttress and into the first stator vane and in fluidic communication with the inner fluid channel.

The vane assembly may also include a second stator vane further defining the inner fluid channel disposed radially inward of the second stator vane and a second stator vane buttress including a boss disposed radially inward of the second stator vane and extending radially into the inner fluid channel. The vane assembly may have a cross vane cooling transfer channel defined through the vane assembly, defining a channel radially inward of the first stator vane and the second stator vane and radially outward of the inner fluid channel and in fluidic communication with the first stator vane cooling channel. The second stator vane may define a second stator vane cooling channel extending radially through the second stator vane and in fluidic communication with the cross vane cooling transfer channel.

The vane assembly may also have a seal weld. The second stator vane buttress may further define the second stator vane cooling channel through the second stator vane buttress, wherein the seal weld occupies a portion of the second stator vane cooling channel and seals the second stator vane cooling channel from fluidic communication with the inner fluid channel.

The vane assembly may have a seal weld disposed in the second stator vane cooling channel, whereby the second stator vane cooling channel is isolated from the inner fluid channel.

The vane assembly may have a chordal seal forming an annular flange extending radially inward of the first stator vane buttress and the second stator vane buttress and disposed at an axially aftmost end of the vane assembly.

Furthermore, the vane assembly may include an upper attachment rail forming a flange disposed at a radially outermost end of the first stator vane and the second stator vane and connecting the first stator vane and the second stator vane together.

Similarly, the vane assembly may include a lower attachment rail forming a flange disposed at a radially innermost end of the first stator vane and the second stator vane and connecting the first stator vane and the second stator vane together.

Moreover, The vane assembly may include both an upper attachment rail including a flange disposed at a radially outermost end of the first stator vane and the second stator vane and connecting the first stator vane and the second stator vane together, and also a lower attachment rail including a flange disposed at a radially innermost end of the first stator vane and the second stator vane and connecting the first stator vane and the second stator vane together.

A vane set is disclosed. A vane set may include a plurality of vane assemblies arranged in an annulus. The vane assemblies may each include a first stator vane defining an inner fluid channel disposed radially inward of the first stator vane, and a first stator vane buttress including a boss disposed radially inward of the first stator vane and extending radially into the inner fluid channel. The first stator vane buttress may define a first stator vane cooling channel extending radially through the first stator vane buttress and into the first stator vane and in fluidic communication with the inner fluid channel.

The vane assemblies of the vane set may each also include an upper attachment rail including a flange disposed at a radially outermost end of the first stator vane and a second stator vane and connecting the first stator vane and the second stator vane together.

The vane assemblies of the vane set may each also include a lower attachment rail including a flange disposed at a radially innermost end of the first stator vane and a second stator vane and connecting the first stator vane and the second stator vane together.

Moreover, the vane assemblies of the vane set may each also include both an upper attachment rail including a flange disposed at a radially outermost end of the first stator vane and a second stator vane and connecting the first stator vane and the second stator vane together, and a lower attachment rail including a flange disposed at a radially innermost end of the first stator vane and the second stator vane and connecting the first stator vane and the second stator vane together.

The vane assemblies of the vane set may each also include a seal weld. The second stator vane buttress may further define a second stator vane cooling channel through the second stator vane buttress, wherein the seal weld occupies a portion of the second stator vane cooling channel and seals the second stator vane cooling channel from fluidic communication with the inner fluid channel.

The vane assemblies of the vane set may each also include a chordal seal forming an annular flange extending radially inward of the first stator vane buttress and the second stator vane buttress and disposed at an axially aftmost end of the vane assembly.

A method of manufacturing a vane assembly is disclosed. The method may include forming a first stator vane having a body defining an inner fluid channel disposed radially inward of the first stator vane, forming a first stator vane buttress including a boss disposed radially inward of the first stator vane and extending radially into the inner fluid channel, and forming a first stator vane cooling channel defined through the first stator vane buttress and into the first stator vane and in fluidic communication with the inner fluid channel.

The method may additionally include forming a second stator vane further defining the inner fluid channel disposed radially inward of the second stator vane, forming a second stator vane buttress including a boss disposed radially inward of the second stator vane and extending radially into the inner fluid channel, and forming a cross vane cooling transfer channel defined through the vane assembly, defining a channel radially inward of the first stator vane and the second stator vane and radially outward of the inner fluid channel and in fluidic communication with the first stator vane cooling channel. Finally, the method may include forming a second stator vane cooling channel defined radially through the second stator vane and in fluidic communication with the cross vane cooling transfer channel.

In various embodiments the method includes forming a seal weld disposed in the second stator vane cooling channel, whereby the second stator vane cooling channel is isolated from the inner fluid channel.

Moreover, the method may include a step of forming a chordal seal including an annular flange extending radially of the first stator vane buttress and the second stator vane buttress and disposed at an axially aftmost end of the vane assembly.

In various embodiments, the method includes forming a second stator vane further defining the inner fluid channel disposed radially inward of the second stator vane, forming a second stator vane buttress including a boss disposed radially inward of the second stator vane and extending radially into the inner fluid channel, and forming a second stator vane cooling channel through the second stator vane buttress wherein a seal weld occupies a portion of the second stator vane cooling channel and seals the second stator vane cooling channel from fluidic communication with the inner fluid channel.

Finally, the method may include forming an upper attachment rail including a flange disposed at a radially outermost end of the first stator vane and a second stator vane and connecting the first stator vane and the second stator vane together, and forming a lower attachment rail comprising a flange disposed at a radially innermost end of the first stator vane and the second stator vane and connecting the first stator vane and the second stator vane together.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
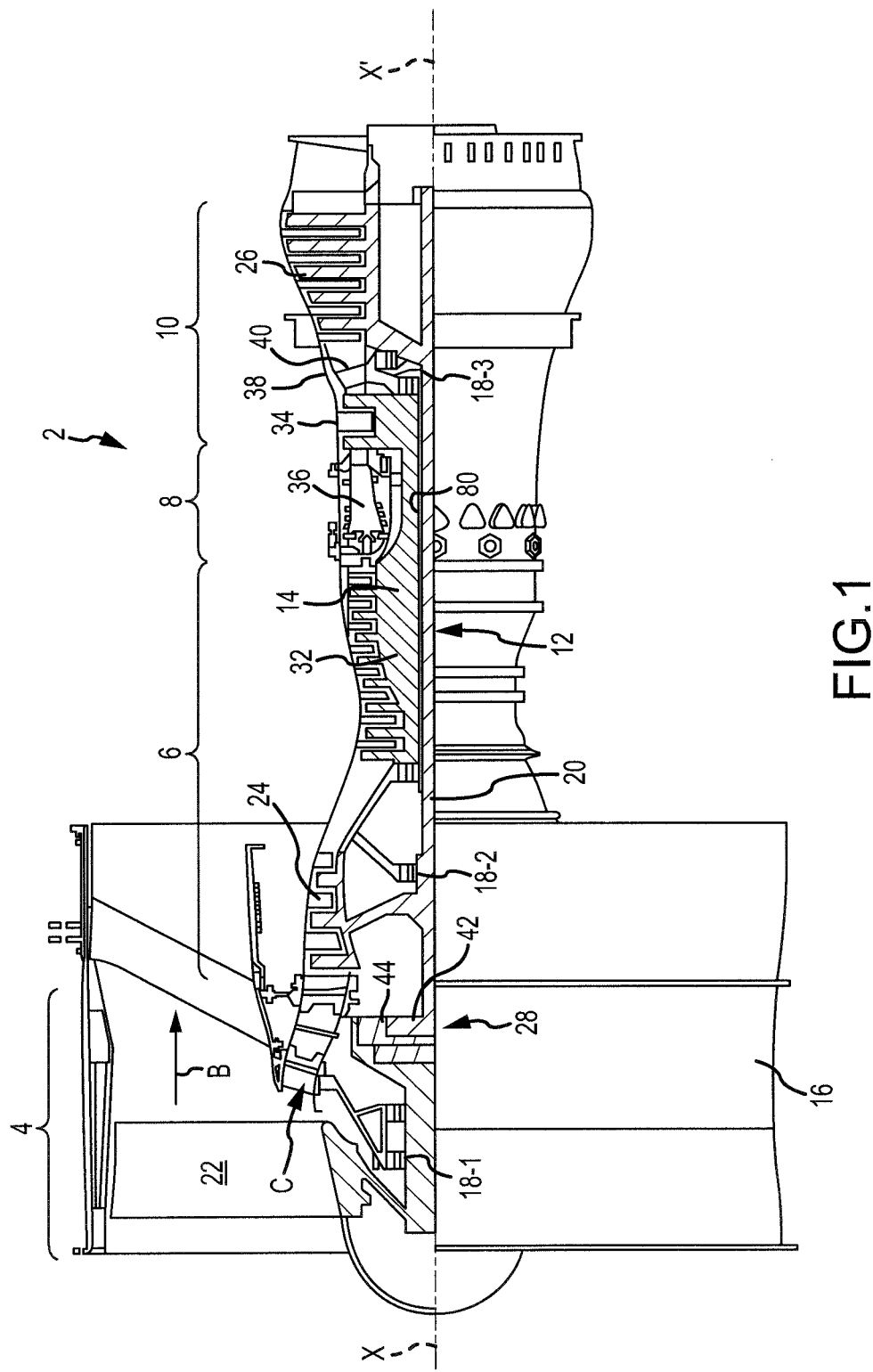
FIG. 1 illustrates cross-sectional view of an exemplary gas turbine engine, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, "fluid" may refer to a gas, a liquid, and/or a gas/liquid mixture. For example, "fluid" may include fuel, air, a fuel/air mixture, and/or other liquids such as water vapor, alcohol, or other liquids.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of a gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that a first component is positioned at a greater distance away from the engine central longitudinal axis, than the second component. A first component that is "radially inward" of a second component means that the first component is positioned closer to the engine central longitudinal axis, than the second component. In the case of components that rotate circumferentially about the engine central longitudinal axis, a first component that is radially inward of a second component rotates through a circumferentially shorter path than the second component.

A first component that is "axially forward" of a second component means that a first component is positioned nearer to the leading edge and farther from the trailing edge of a rotating structure, than the second component. A first component that is "axially aft" of a second component means that the first component is positioned farther from the leading edge and nearer to the trailing edge of a rotating structure, than the second component.

Figure 2:
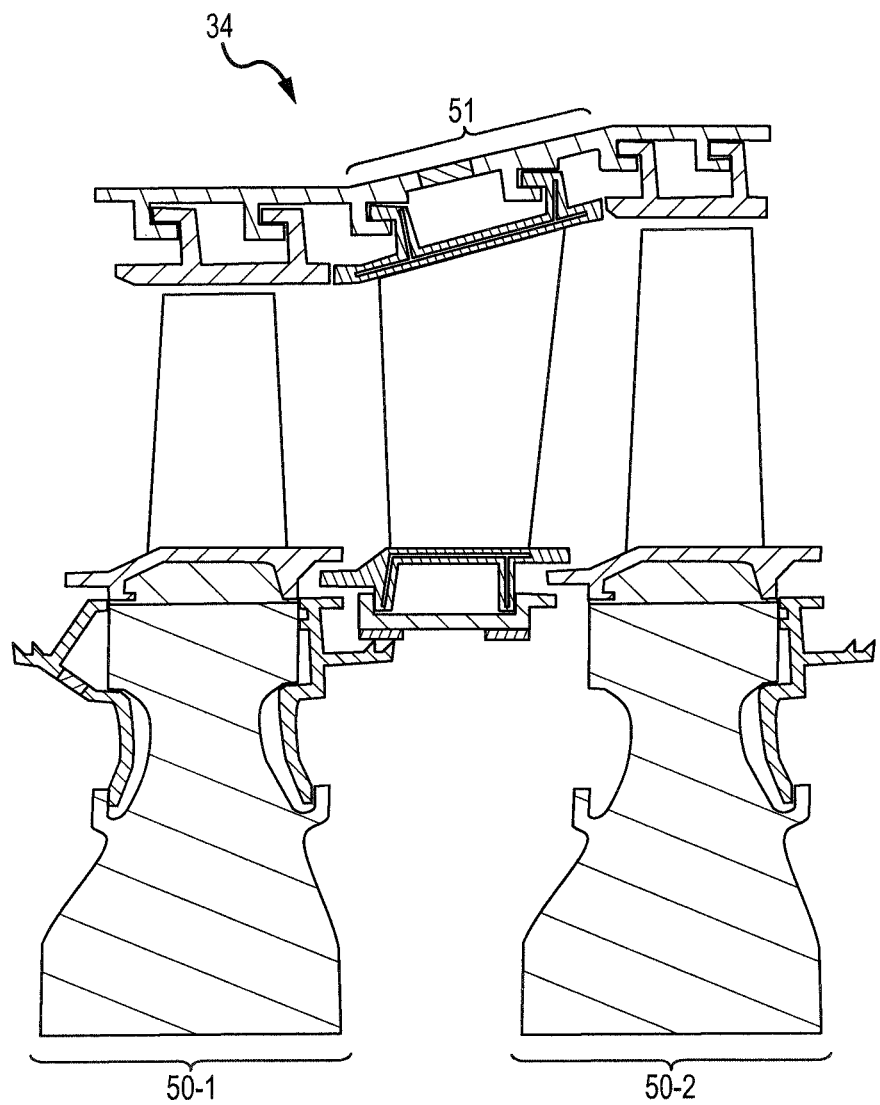
FIG. 2 illustrates a cross-sectional view of airfoils, specifically turbine blades and turbine vanes in accordance with various embodiments.

In various embodiments and with reference to FIGS. 1 and 2, an exemplary gas turbine engine 2 is provided. Gas turbine engine 2 may be a two-spool turbofan that generally incorporates a fan section 4, a compressor section 6, a combustor section 8 and a turbine section 10. Alternative engines may include, for example, an augmentor section among other systems or features. In operation, fan section 4 can drive air along a bypass flow-path B while compressor section 6 can drive air along a core flow-path C for compression and communication into combustor section 8 then expansion through turbine section 10. Although depicted as a turbofan gas turbine engine 2 herein, it should be understood that the concepts described herein are not limited to use with turbofans as the teachings may be applied to other types of turbine engines including three-spool architectures.

Gas turbine engine 2 may generally comprise a low speed spool 12 and a high speed spool 14 mounted for rotation about an engine central longitudinal axis X-X' relative to an engine static structure 16 via several bearing systems 18-1, 18-2, and 18-3. It should be understood that various bearing systems at various locations may alternatively or additionally be provided, including for example, bearing system 18-1, bearing system 18-2, and bearing system 18-3.

Low speed spool 12 may generally comprise an inner shaft 20 that interconnects a fan 22, a low pressure compressor section 24 (e.g., a first compressor section) and a low pressure turbine section 26 (e.g., a first turbine section). Inner shaft 20 may be connected to fan 22 through a geared architecture 28 that can drive the fan 22 at a lower speed than low speed spool 12. Geared architecture 28 may comprise a gear assembly 42 enclosed within a gear housing 44. Gear assembly 42 couples the inner shaft 20 to a rotating fan structure. High speed spool 14 may comprise an outer shaft 30 that interconnects a high pressure compressor section 32 (e.g., second compressor section) and high pressure turbine section 34 (e.g., second turbine section). A combustor 36 may be located between high pressure compressor section 32 and high pressure turbine section 34. A mid-turbine frame 38 of engine static structure 16 may be located generally between high pressure turbine section 34 and low pressure turbine section 26. Mid-turbine frame 38 may support one or more bearing systems 18 (such as 18-3) in turbine section 10. Inner shaft 20 and outer shaft 30 may be concentric and rotate via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C may be compressed by low pressure compressor section 24 then high pressure compressor section 32, mixed and burned with fuel in combustor 36, then expanded over high pressure turbine section 34 and low pressure turbine section 26. Mid-turbine frame 38 includes airfoils 40, which are in the core airflow path. Turbines 26, 34 rotationally drive the respective low speed spool 12 and high speed spool 14 in response to the expansion.

Gas turbine engine 2 may be, for example, a high-bypass geared aircraft engine. In various embodiments, the bypass ratio of gas turbine engine 2 may be greater than about six (6). In various embodiments, the bypass ratio of gas turbine engine 2 may be greater than ten (10). In various embodiments, geared architecture 28 may be an epicyclic gear train, such as a star gear system (sun gear in meshing engagement with a plurality of star gears supported by a carrier and in meshing engagement with a ring gear) or other gear system. Geared architecture 28 may have a gear reduction ratio of greater than about 2.3 and low pressure turbine section 26 may have a pressure ratio that is greater than about 5. In various embodiments, the bypass ratio of gas turbine engine 2 is greater than about ten (10:1). In various embodiments, the diameter of fan 22 may be significantly larger than that of the low pressure compressor section 24, and the low pressure turbine section 26 may have a pressure ratio that is greater than about 5:1. Low pressure turbine section 26 pressure ratio may be measured prior to inlet of low pressure turbine section 26 as related to the pressure at the outlet of low pressure turbine section 26 prior to an exhaust nozzle. It should be understood, however, that the above parameters are exemplary of various embodiments of a suitable geared architecture engine and that the present disclosure contemplates other turbine engines including direct drive turbofans.

In various embodiments, the next generation of turbofan engines may be designed for higher efficiency, which is associated with higher pressure ratios and higher temperatures in the high speed spool 14. These higher operating temperatures and pressure ratios may create operating environments that may cause thermal loads that are higher than thermal loads conventionally encountered, which may shorten the endurance life of current components.

In various embodiments, high speed spool 14 may comprise alternating rows of rotating rotors and stationary stators. Stators may have a cantilevered configuration or a shrouded configuration. More specifically, stators may comprise an airfoil, such as a stator vane, a casing support (such as an upper vane attachment rail) and a hub support (such as a lower vane attachment rail). In this regard, a stator vane may be supported along an outer diameter by casing support and along an inner diameter by a hub support. In contrast, a cantilevered stator may comprise a stator vane that is only retained and/or supported at the casing (e.g., an outer diameter) (such as an upper vane attachment rail).

In various embodiments, airfoils such as rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or high pressure section) to increase and/or improve the efficiency of the engine and, more specifically, to achieve maximum and/or near maximum compression and efficiency when the straightened air is compressed and spun by rotor(s).

Operating conditions in high pressure compressor section 32 may be approximately 1400° F. (approximately 760° C.) or more. As noted above and with reference to FIGS. 1 and 2, rotor blade sets 50 (such as rotor blade set 50-1, 50-2) and stator vane sets 51 are subject to a high external heat load that is localized to the stagnation location, which is where the hot combustion gases impinge on the airfoil.

As such, cooling holes may be positioned in the surface of at least one of the blades or the vanes. Cooling air may be ejected from the cooling holes. The cooling holes may be configured to produce a layer of cooling air that flows over the leading edge surface and/or other surfaces to protect the metal surface from exposure to the high temperature hot gas flow. The cooling air may be ejected in a radial direction and/or an axial direction of the blade or vane. A portion of the cooling air may thus migrate onto the leading edge surface of the blade or vane to provide a layer of cooling air.

Moreover, cooling channels may be positioned within the interior volume of at least one of the blades or vanes. Cooling air may be conducted through the cooling channels in route to the cooling holes. The cooling channels may be configured to conduct heat from the blades and/or vane, to the cooling air flowing through the cooling channel to protect the blade and/or vane from overheating.

Other cooling channels may be positioned along the inner diameter of at least one of the blades or vanes and/or between multiple blades or vanes. Such cooling channels may conduct heat away from the blades and/or vanes.

Figure 3:
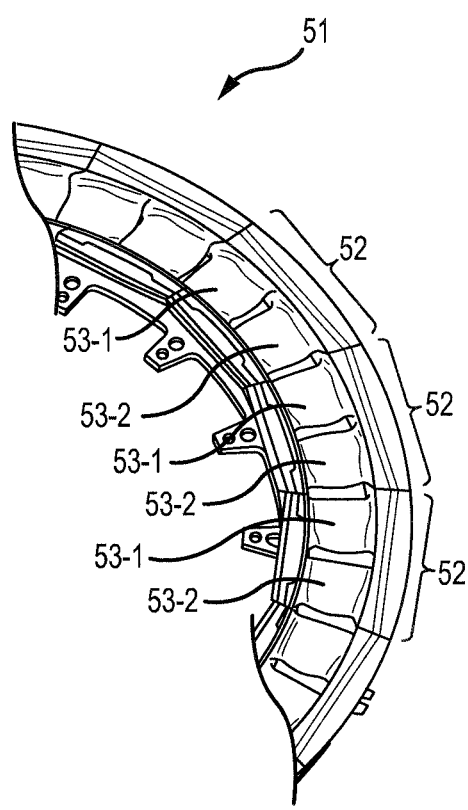
FIG. 3 illustrates a stator vane set comprising vane assemblies in accordance with various embodiments.
Figure 4:
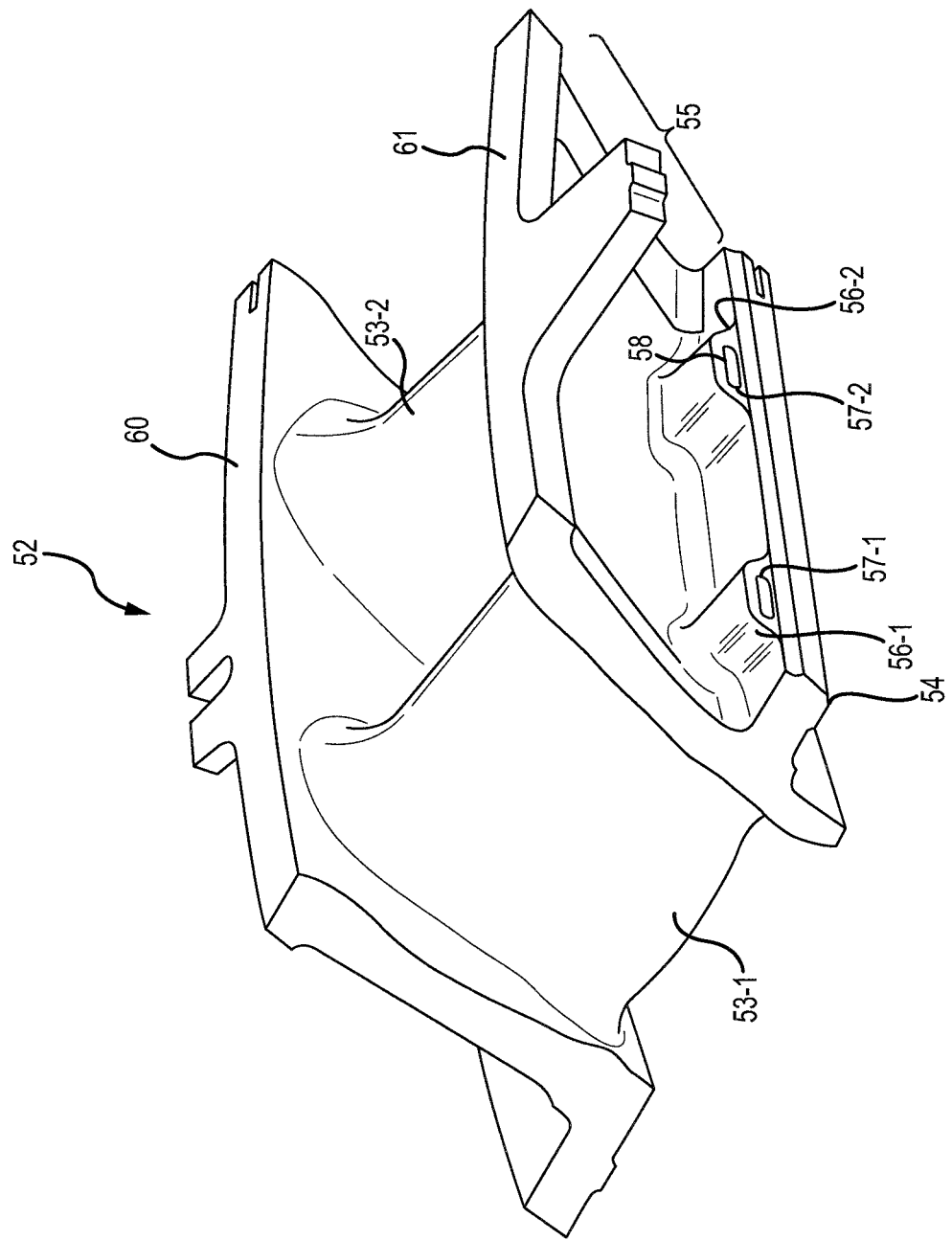
FIG. 4 illustrates a detailed view of a vane assembly in accordance with various embodiments.

Furthermore, and as illustrated in FIGS. 3 and 4, airfoils such as those of stator vane set 51, may be combined such as in vane assemblies 52, which are made of multiple airfoils, such as a first stator vane 53-1 and a second stator vane 53-2. Multiple airfoils may share a common gaspath, for instance, cooling air may enter a first stator vane 53-1 and be directed along a path through first stator vane 53-1 and then through second stator vane 53-2. As used herein, a "path through" or "extending into" includes a path that does not radially traverse any portion of the first stator vane 53-1 or second stator vane 53-2, but instead annularly extends beneath the first stator vane 53-1 or second stator vane 53-2, such as to cool the stator vane(s) and surrounding structures, but without extending radially outward. While performance considerations may dictate that the first stator vane 53-1 and second stator vane 53-2 have a common, shared gaspath, manufacturing considerations may direct that both the first stator vane 53-1 and second stator vane 53-2 have similar construction, such as identical cooling channels 57-1, 57-2, so that, initially, separate gaspaths are created through the first stator vane 53-1 and second stator vane 53-2, so that cooling air would travel through the stator vanes independently, rather than through one stator vane then the other as is desired. For instance, it may be desired to insert into cooling channels 57-1 and 57-2, a manufacturing structure used to connect between the cooling channels during the casting process to join different casting structures together, reducing undesirable movement and part breakage during the manufacturing process. However, the shape, number, and location of connections between cooling channels may interact with the shape, length, and other features of the cooling channels, in order to affect the pressure and flow direction of the cooling air through each airfoil. As such, configurations that may be easily manufactured may not produce a desired cooling behavior, whereas configurations that produce a desired cooling behavior may be difficult to manufacture. Various embodiments to address these countervailing considerations are presented herein. For example, a seal weld 58 may be introduced into one of cooling channel 57-1 and 57-2 after casting to differentiate the gaspaths so that cooling air travels through one stator vane, then the other. Moreover, and with reference to FIG. 2, while various features are discussed herein with reference to stator vanes 53, vane assemblies 52, and stator vane sets 51, similar features may alternately or additionally be implemented in rotor blade sets 50-1 and 50-2.

A cooling channel may define a through hole and/or a channel defined through a wall of a stator vane set 51 between various channels of a stator vane set 51 described herein. For instance, in various embodiments a stator vane set 51 is manufactured by a casting process. The channels within the finished stator vane set 51 may comprise impressions of solid mold pieces. As such, various connective elements of the mold may cause there to be channels and/or through holes that are artifacts of the manufacturing process. In various embodiments, some of these artifacts may be undesired. As such, a seal weld 58 may be introduced into one cooling channel 57-1, 57-2, to address performance considerations, without hampering manufacturing considerations.

With reference to FIG. 3, a stator vane set 51 may comprise an annular ring of airfoils. The airfoils (for example, first stator vane 53-1 and a second stator vane 53-2) may be further grouped, for instance into pairs ("doublets" for example, vane assembly 52) comprising monolithic units, which are then joined together into the stator vane set 51. In further embodiments, the airfoils may be grouped into groups of three ("triplets") comprising monolithic units, or may be single airfoils ("singlets") each comprising a monolithic unit, or any other arrangement, which are then joined together into the stator vane set 51. Moreover, a stator vane set 51 may comprise any number of vane assemblies 52. In various embodiments, the stator vane set 51 comprises multiple vane assemblies 52, each vane assembly 52 comprising a first stator vane 53-1 and a second stator vane 53-2. Thus, the stator vane set 51 may comprise multiple airfoils, although any grouping of airfoils or number of airfoils may be contemplated, as desired.

Figure 5:
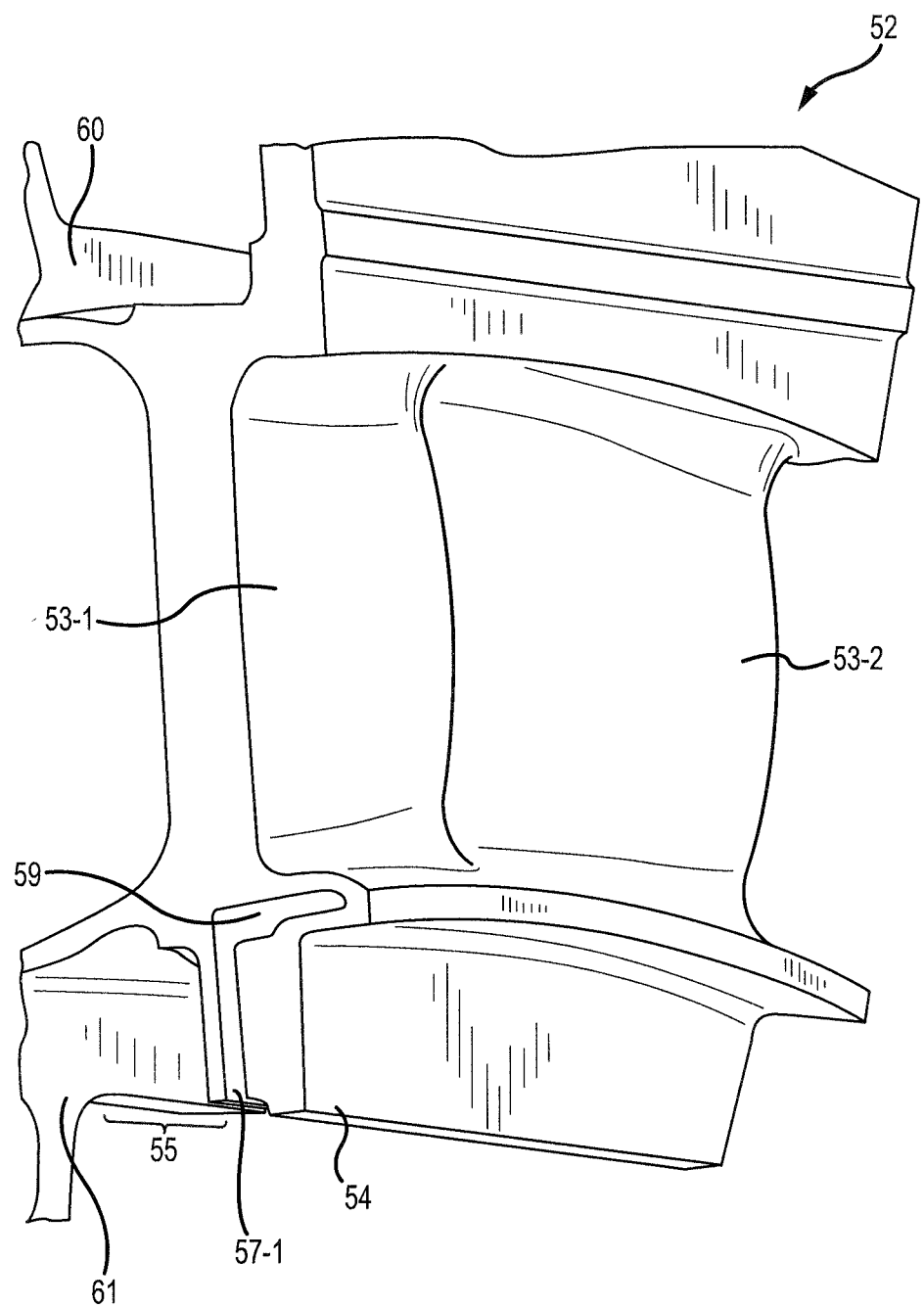
FIG. 5 illustrates a cutaway view of the vane assembly of FIG. 4, in accordance with various embodiments.

With reference to FIGS. 4 and 5, a vane assembly 52 is illustrated. A vane assembly 52 comprises a monolithic body forming at least one airfoil, such as a vane. A vane assembly 52 may comprise an upper vane attachment rail 60, a first stator vane 53-1, a second stator vane 53-2, and a lower vane attachment rail 61. Additional features may be incorporated, for instance, the vane assembly 52 may further comprise a chordal seal 54, a first stator vane buttress 56-1, a second stator vane buttress 56-2, and a seal weld 58. Moreover, the vane assembly 52 comprising a monolithic body may define an inner fluid channel 55, a first stator vane cooling channel 57-1, a second stator vane cooling channel 57-2, a cross vane cooling transfer channel 59, each comprising a channel disposed within the body of the vane assembly 52 and configured to conduct cooling air through various portions of the vane assembly 52. Thus, one may appreciate that as used herein "body" refers to the solid material portion of vane assembly 52. Additionally, while features of a vane assembly 52 are discussed, because these features may similarly be implemented in rotor blade sets 50, "body" may also refer to the solid material portion of at least a portion of a rotor blade set 50, as applicable.

In various embodiments, the vane assembly 52 may comprise a first stator vane 53-1. The first stator vane 53 may comprise a monolithic body forming an airfoil, for instance, a vane. The first stator vane 53 may extend radially outward from the lower vane attachment rail 61. The first stator vane 53 may comprise an airfoil whereby the flow of fluid through the turbine engine may be directed. In general, vanes straighten the flow of air, diminishing the rotational flow of the air and redirecting it in a substantially axial direction. As such, the vane may be planar, or may be concave, or may be convex, or may be symmetrical or semi-symmetrical or may be a combination of shapes. The vane may have a chord line corresponding to an angle of attack versus the relative fluid flow. The angle of attack may be determined as desired.

In various embodiments, the vane assembly 52 may comprise a second stator vane 53-2. The second stator vane 53 may comprise a monolithic body forming an airfoil, for instance, a vane. The second stator vane 53 may extend radially outward from the lower vane attachment rail 61. The second stator vane 53 may comprise an airfoil whereby the flow of fluid through the turbine engine may be directed. In general, vanes straighten the flow of air, diminishing the rotational flow of the air and redirecting it in a substantially axial direction. As such, the vane may be planar, or may be concave, or may be convex, or may be symmetrical or semi-symmetrical or may be a combination of shapes. The vane may have a chord line corresponding to an angle of attack versus the relative fluid flow. The angle of attack may be determined as desired.

The vane assembly 52 may comprise an upper vane attachment rail 60. The upper vane attachment rail 60 may comprise a flange disposed at the radially outermost end of the vanes and connecting the first stator vane 53-1 and the second stator vane 53-2 together. The upper vane attachment rail 60 may support the first stator vane 53-1 and the second stator vane 53-2 and hold the stator vanes 53-1, 53-2 in substantially fixed position. Moreover, the upper vane attachment rail 60 may connect to other engine structures, for instance, an engine casing, such as by fasteners, thereby retaining the vane assembly 52 in place. Furthermore, the upper vane attachment rail 60 may abut at each of its circumferentially outboard ends, the upper vane attachment rails 60 of adjacent vane assemblies 52 arranged in a stator vane set 51.

The vane assembly 52 may comprise a lower vane attachment rail 61. The lower vane attachment rail 61 may comprise a flange disposed at the radially innermost end of the vanes and connecting the first stator vane 53-1 and the second stator vane 53-2 together. The lower vane attachment rail 61 may support the first stator vane 53-1 and the second stator vane 53-2 and hold the stator vanes 53-1, 53-2 in substantially fixed position. Moreover, the lower vane attachment rail 61 may connect to other engine structures, for instance, an engine hub, such as by fasteners, thereby retaining the vane assembly 52 in place. Furthermore, the lower vane attachment rail 61 may abut at each of its circumferentially outboard ends, the lower vane attachment rail 61 of adjacent vane assemblies 52 arranged in a stator vane set 51.

The vane assembly 52 may comprise a chordal seal 54. The chordal seal 54 is an annular flange extending radially inward of the vane assembly 52, beneath the stator vanes 53-1, 53-2. As used herein, "annular flange" may include a misaligned polygon type geometry and/or an annulus type geometry. In various embodiments, the chordal seal 54 is disposed at the axially aft most side of the vane assembly 52. The chordal seal 54 may extend radially inward of the first stator vane buttress 56-1 and the second stator vane buttress 56-2. The chordal seal 54 may stanch the leakage of air between the trailing edge of the vane assembly 52 and the inner fluid channel 55, discussed further herein. Thus, the chordal seal 54 may define at least a portion of the inner fluid channel 55 and provide fluidic isolation between the inner fluid channel 55 and the flow of fluid through the turbine engine vanes and stators. Moreover, the chordal seal 54 may transfer structural loads from the vane assembly 52 to supporting turbine engine structures. In this manner, load concentrations may be ameliorated, diminishing unwanted bending, vibration, and metal fatigue.

The inner fluid channel 55 may comprise a channel running radially inward of the first stator vane 53-1 and the second stator vane 53-2 and defined by the body of the vane assembly 52. The inner fluid channel 55 may be defined on the axially aft end by the chordal seal 54 and on the axially forward end by the lower vane attachment rail 61. The inner fluid channel 55 may comprise a gas path whereby cooling air is conveyed to the first stator vane cooling channel 57-1 and the second stator vane cooling channel 57-2. The inner fluid channel 55 may align with the corresponding inner fluid channel 55 of adjacent vane assemblies 52 in stator vane sets 51, so that a continuous annular channel extends circumferentially about the inner circumference of the vane assembly 52 and permits cooling air to be conducted to each vane assembly 52.

The inner fluid channel 55 may be in fluid communication with the first stator vane cooling channel 57-1 and the second stator vane cooling channel 57-2. The first stator vane cooling channel 57-1 may comprise a channel defined by the body of the first stator vane 53-1 and conducting the flow of cooling air from the inner fluid channel 55 into one or more internal passageway of the first stator vane 53-1, such as into cross vane cooling transfer channel 59. In this manner, cooling air may be introduced to the cross vane cooling transfer channel 59 wherein it circulates and conducts heat away from the first stator vane 53-1 and/or the second stator vane 53-2. The first stator vane cooling channel 57-1 may be in further fluidic communication with the second stator vane cooling channel 57-2.

Similarly, the second stator vane cooling channel 57-2 may comprise a channel defined by the body of the second stator vane 53-2 and conducting the flow of cooling air from first stator vane cooling channel 57-1 and into one or more internal passageway of the second stator vane 53-2, such as cross vane cooling transfer channel 59. The second stator vane cooling channel 57-2 may be in fluidic communication with the inner fluid channel 55 and conduct cooling air from the inner fluid channel 55 into the second stator cooling channel 57-2, although in various embodiments, the fluidic communication with the inner fluid channel 55 is precluded through the introduction of a seal weld 58 into the second stator cooling channel 57-2 to block it from the inner fluid channel 55. Thus, cooling air may be introduced to the second stator vane 53-2 directly through the second stator vane cooling channel 57-2, or the second stator vane cooling channel 57-2 may be blocked from communication with the inner fluid channel 55 by a seal weld 58 and cooling air may be introduced by the cross vane cooling transfer channel 59, wherein it circulates and conducts heat away from the second stator vane 53-2. Notably, the first stator vane cooling channel 57-1 may receive cooling air from the inner fluid channel 55, whereas the second stator vane cooling channel 57-2 may receive cooling air from the first stator vane cooling channel 57-1, such as via a cross vane cooling transfer channel 59 (discussed herein). However, in the interest of addressing manufacturability concerns discussed above, the second stator vane cooling channel 57-2 may also provide for fluidic communication with the inner fluid channel 55. As such, the vane assembly 52 may further comprise a seal weld 58 disposed in the second stator vane cooling channel 57-2 and occupying the second stator vane cooling channel 57-2, so that following manufacturing, the second stator vane cooling channel 57-2 may be isolated from the inner fluid channel 55, except through the first stator vane cooling channel 57-1, such as via a cross vane cooling transfer channel 59.

The first stator vane cooling channel 57-1 and the second stator vane cooling channel 57-2 may be connected in fluidic communication by a cross vane cooling transfer channel 59 defined through the interior of the body of the vane assembly 52 as a channel radially inward of the first stator vane 53-1 and second stator vane 53-2, but radially outward of the inner fluid channel 55, thus being separated from the inner fluid channel 55 by a portion of the body of the vane assembly 52. In other words, as used herein, the cross vane cooling transfer channel 59 may be said to extend into the first stator vane 53-1 and/or the second stator vane 53-2, as well as may be said to be defined by the body of the first stator vane 53-1 and/or the second stator vane 53-2. The cross vane cooling transfer channel 59 may extend circumferentially, defined through the body of the vane assembly 52 from the first stator vane cooling channel 57-1 to the second stator vane cooling channel 57-2.

The vane assembly 52 may comprise a first stator vane buttress 56-1. A first stator vane buttress 56-1 may comprise a boss extending radially inward from the base of the first stator vane 53-1. The boss may be axially adjacent to the chordal seal 54, and may in various embodiments be unitary with the chordal seal 54. The first stator vane buttress 56-1 may define a portion of the first stator vane cooling channel 57-1, such that an aperture disposed through the radially inward face of the boss comprising the first stator vane buttress 56-1 permits fluidic communication between the inner fluid channel 55 and the first stator vane cooling channel 57-1. The boss may extend radially inward until it is radially parallel with the radially outermost portion of the chordal seal 54. In this manner, the boss may enhance the strength of the vane assembly 52 and stiffen the load path from the first stator vane 53-1 to the chordal seal 54. As such, the boss may enhance the transfer of structural loads from the vane assembly 52, such as from the first stator vane 53-1 to the chordal seal 54. In further embodiments, the boss may reinforce the vane assembly 52, enhancing the distribution of structural loads throughout the vane assembly 52 and ameliorating localized bending or load concentration, diminishing unwanted bending, vibration, and metal fatigue.

The first stator vane buttress 56-1 may have a geometry. The geometry may comprise a substantially rectangular shape. In various embodiments, the leading edge of the first stator vane buttress 56-1 (e.g., the first edge that encounters the flow of air through the inner fluid channel 55, for example, in response to the direction of airflow through the inner fluid channel 55) and/or the trailing edge of the first stator vane buttress 56-1 is tapered, streamlining the boss and enhancing the laminarity of the airflow, diminishing the resistance encountered by the flowing air. In further embodiments, the leading edge and/or trailing edge is curved, or rounded, or any other shape to achieve desired fluid flow behavior. In various embodiments, a line lying in the plane of the leading edge and/or trailing edge of the first stator vane buttress 56-1 extends in a plane substantially parallel with a plane to which the central axis X'-X of the engine similarly lies. As such, the leading edge and/or trailing edge of the first stator vane buttress 56-1 may be said to be "square" rather than tapered. In further embodiments, the leading edge and/or trailing edge is similarly tapered, or rounded, or curved, or any other desired shape.

The vane assembly 52 may comprise a second stator vane buttress 56-2. A second stator vane buttress 56-2 may comprise a boss extending radially inward from the base of the second stator vane 53-2. The boss may be axially adjacent to the chordal seal 54, and may in various embodiments be unitary with the chordal seal 54. The second stator vane buttress 56-2 may define a portion of the second stator vane cooling channel 57-2, such that an aperture disposed through the radially inward face of the boss comprising the second stator vane buttress 56-2 permits fluidic communication between the inner fluid channel 55 and the second stator vane cooling channel 57-2 (albeit, being later blocked from fluidic communication with the inner fluid channel 55 by a seal weld 58). The boss may extend radially inward until it is radially parallel with the radially outward most portion of the chordal seal 54. In this manner, the boss may enhance the strength of the vane assembly 52 and stiffen the load path from the second stator vane 53-2 to the chordal seal 54. As such, the boss may enhance the transfer of structural loads from the vane assembly 52, such as from the second stator vane 53-2 to the chordal seal 54. In further embodiments, the boss may reinforce the vane assembly 52, enhancing the distribution of structural loads throughout the vane assembly 52 and ameliorating localized bending or load concentration. Still furthermore, the boss may add structural material compensating for the structural material removed during the manufacturing process to form the various fluid channels. In this manner, load concentrations may be ameliorated, diminishing unwanted bending, vibration, and metal fatigue.

The second stator vane buttress 56-2 may have a geometry. The shape may comprise a substantially rectangular geometry. In various embodiments, the leading edge of second stator vane buttress 56-2 (e.g., the first edge that encounters the flow of air through the inner fluid channel 55, for example, in response to the direction of airflow through the inner fluid channel 55) and/or the trailing edge of the second stator vane buttress 56-2 is tapered, streamlining the boss and enhancing the laminarity of the airflow, diminishing the resistance encountered by the flowing air. In further embodiments, the leading edge and/or trailing edge is curved, or rounded, or any other shape to achieve desired fluid flow behavior. In various embodiments, a line lying in the plane of the leading edge and/or trailing edge of the second stator vane buttress 56-2 extends in a plane substantially parallel with a plane in which the central axis X'-X of the engine similarly lies. As such, the leading edge and/or trailing edge of the second stator vane buttress 56-2 may be said to be "square" rather than tapered. In further embodiments, the leading edge and/or trailing edge is similarly tapered, or rounded, or curved, or any other desired shape.

Figure 6:
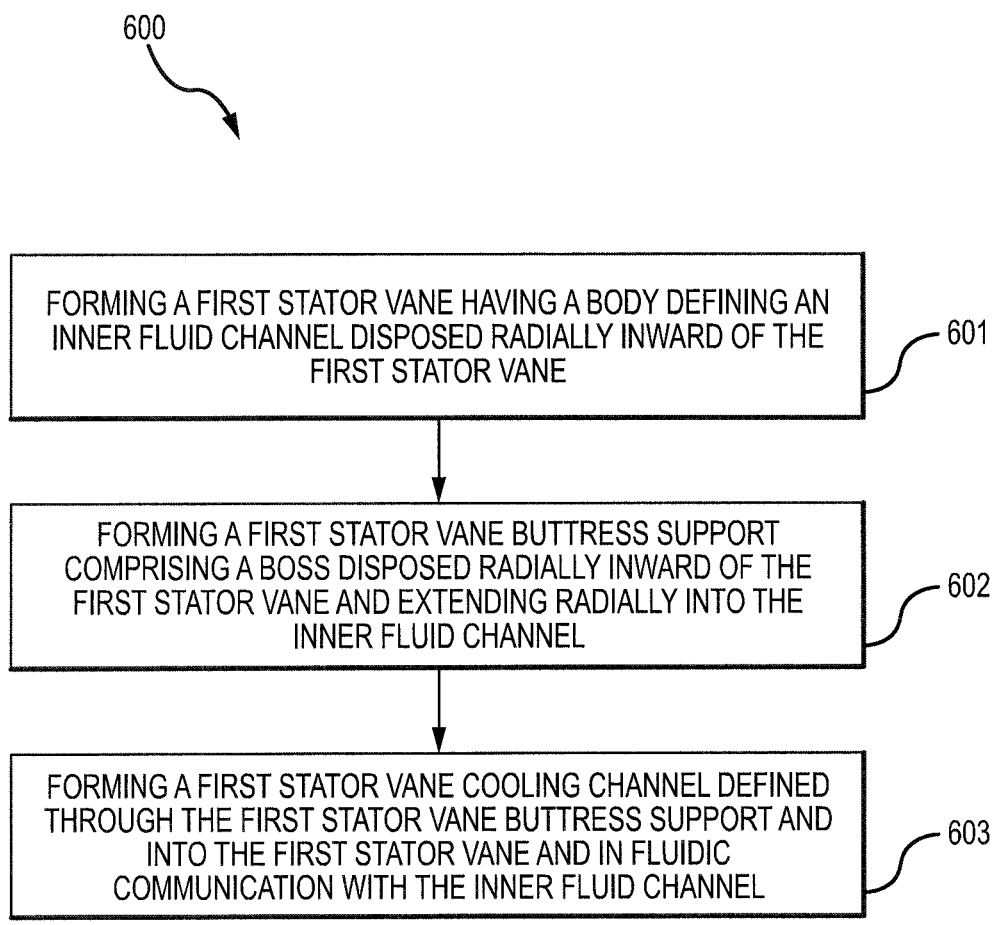
FIG. 6 illustrates a method of forming a vane assembly.

With reference to FIGS. 1-5, and with particular reference to FIG. 6, a method 600 for manufacturing a vane assembly is disclosed. The method 600 may include forming a first stator vane having a body defining an inner fluid channel disposed radially inward of the first stator vane (Step 601). The method 600 may further include forming a first stator vane buttress comprising a boss disposed radially inward of the first stator vane and extending radially into the inner fluid channel. Similarly, the method may further include forming a first stator vane cooling channel defined through the first stator vane buttress and into the first stator vane (e.g., extending radially to fluidically communicate with the inner fluid channel, but in various embodiments not extending radially through the airfoil) and in fluidic communication with the inner fluid channel (Step 603). These steps may be performed in various orders, or in various embodiments, multiple steps may be performed at the same time.

Various benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting. For example, while the discussion herein has been focused on airfoils comprising stator vanes, as also mentioned, the various features and elements may be implemented in airfoils comprising rotor vanes, or any desired airfoil.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A vane assembly comprising:
a first stator vane defining an inner fluid channel disposed radially inward of the first stator vane;
a chordal seal comprising an annular flange extending radially inward of the first stator vane, wherein the chordal seal forms a wall of the inner fluid channel; and
a first stator vane buttress comprising a boss disposed radially inward of the first stator vane and extending radially into the inner fluid channel,
the first stator vane buttress defining a first stator vane cooling channel extending radially through the first stator vane buttress and into the first stator vane and in fluidic communication with the inner fluid channel, wherein the first stator vane buttress axially protrudes from and is axially adjacent to the chordal seal.

2. The vane assembly according to claim 1, further comprising:
a second stator vane further defining the inner fluid channel disposed radially inward of the second stator vane;
a second stator vane buttress comprising a boss disposed radially inward of the second stator vane and extending radially into the inner fluid channel; and
a cross vane cooling transfer channel defined through the vane assembly, defining a channel radially inward of the first stator vane and the second stator vane and radially outward of the inner fluid channel and in fluidic communication with the first stator vane cooling channel,
the second stator vane defining a second stator vane cooling channel extending radially through the second stator vane and in fluidic communication with the cross vane cooling transfer channel.

3. The vane assembly according to claim 2, further comprising:
a seal weld disposed in the second stator vane cooling channel, whereby the second stator vane cooling channel is isolated from the inner fluid channel.

4. The vane assembly according to claim 2, further comprising:
a seal weld,
wherein the second stator vane buttress further defines the second stator vane cooling channel through the second stator vane buttress,
wherein the seal weld occupies a portion of the second stator vane cooling channel and seals the second stator vane cooling channel from fluidic communication with the inner fluid channel.

5. The vane assembly of claim 4, further comprising an upper attachment rail comprising a flange disposed at a radially outermost end of the first stator vane and the second stator vane and connecting the first stator vane and the second stator vane together.

6. The vane assembly of claim 4, further comprising a lower attachment rail comprising a flange disposed at a radially innermost end of the first stator vane and the second stator vane and connecting the first stator vane and the second stator vane together.

7. The vane assembly of claim 4, further comprising:
an upper attachment rail comprising a flange disposed at a radially outermost end of the first stator vane and the second stator vane and connecting the first stator vane and the second stator vane together; and
a lower attachment rail comprising a flange disposed at a radially innermost end of the first stator vane and the second stator vane and connecting the first stator vane and the second stator vane together.

8. The vane assembly of claim 1,
wherein the first vane buttress is unitary with the chordal seal.

9. A vane set comprising:
a plurality of vane assemblies arranged in an annulus;
the vane assemblies each comprising:

a first stator vane defining an inner fluid channel disposed radially inward of the first stator vane;

a first stator vane buttress comprising a boss disposed radially inward of the first stator vane and extending radially into the inner fluid channel, the first stator vane buttress defining a first stator vane cooling channel extending radially through the first stator vane buttress and into the first stator vane and in fluidic communication with the inner fluid channel;

a seal weld, wherein a second stator vane buttress further defines a second stator vane cooling channel through the second stator vane buttress, wherein the seal weld occupies a portion of the second stator vane cooling channel and seals the second stator vane cooling channel from fluidic communication with the inner fluid channel.

10. The vane set according to claim 9, the vane assemblies each further comprising:

an upper attachment rail comprising a flange disposed at a radially outermost end of the first stator vane and a second stator vane and connecting the first stator vane and the second stator vane together.

11. The vane set according to claim 9, the vane assemblies each further comprising:

a lower attachment rail comprising a flange disposed at a radially innermost end of the first stator vane and a second stator vane and connecting the first stator vane and the second stator vane together.

12. The vane set according to claim 9, the vane assemblies each further comprising:

an upper attachment rail comprising a flange disposed at a radially outermost end of the first stator vane and a second stator vane and connecting the first stator vane and the second stator vane together; and a lower attachment rail comprising a flange disposed at a radially innermost end of the first stator vane and the second stator vane and connecting the first stator vane and the second stator vane together.

13. The vane set according to claim 9, the vane assemblies each further comprising:

a chordal seal comprising an annular flange extending radially inward of the first stator vane buttress and the second stator vane buttress and disposed at an axially aftmost end of the vane assembly.

14. A method of manufacturing a vane assembly comprising:

forming a first stator vane having a body comprising a chordal seal, the body defining an inner fluid channel disposed radially inward of the first stator vane;

forming a first stator vane buttress comprising a boss disposed radially inward of the first stator vane and extending radially into the inner fluid channel, wherein the first stator vane buttress axially protrudes from and is axially adjacent to the chordal seal; and forming a first stator vane cooling channel defined through the first stator vane buttress and into the first stator vane and in fluidic communication with the inner fluid channel.

15. The method of manufacturing according to claim 14, further comprising:

forming a second stator vane further defining the inner fluid channel disposed radially inward of the second stator vane;

forming a second stator vane buttress comprising a boss disposed radially inward of the second stator vane and extending radially into the inner fluid channel;

forming a cross vane cooling transfer channel defined through the vane assembly, defining a channel radially inward of the first stator vane and the second stator vane and radially outward of the inner fluid channel and in fluidic communication with the first stator vane cooling channel; and forming a second stator vane cooling channel defined radially through the second stator vane and in fluidic communication with the cross vane cooling transfer channel.

16. The method of manufacturing according to claim 15, further comprising:

forming a seal weld disposed in the second stator vane cooling channel, whereby the second stator vane cooling channel is isolated from the inner fluid channel.

17. The method of manufacturing according to claim 14, further comprising:

forming a second stator vane further defining the inner fluid channel disposed radially inward of the second stator vane;

forming a second stator vane buttress comprising a boss disposed radially inward of the second stator vane and extending radially into the inner fluid channel;

forming a second stator vane cooling channel through the second stator vane buttress wherein a seal weld occupies a portion of the second stator vane cooling channel and seals the second stator vane cooling channel from fluidic communication with the inner fluid channel.

18. The method of manufacturing according to claim 17, further comprising:

forming an upper attachment rail comprising a flange disposed at a radially outermost end of the first stator vane and a second stator vane and connecting the first stator vane and the second stator vane together; and forming a lower attachment rail comprising a flange disposed at a radially innermost end of the first stator vane and the second stator vane and connecting the first stator vane and the second stator vane together.

* * * * *